Figure 1:
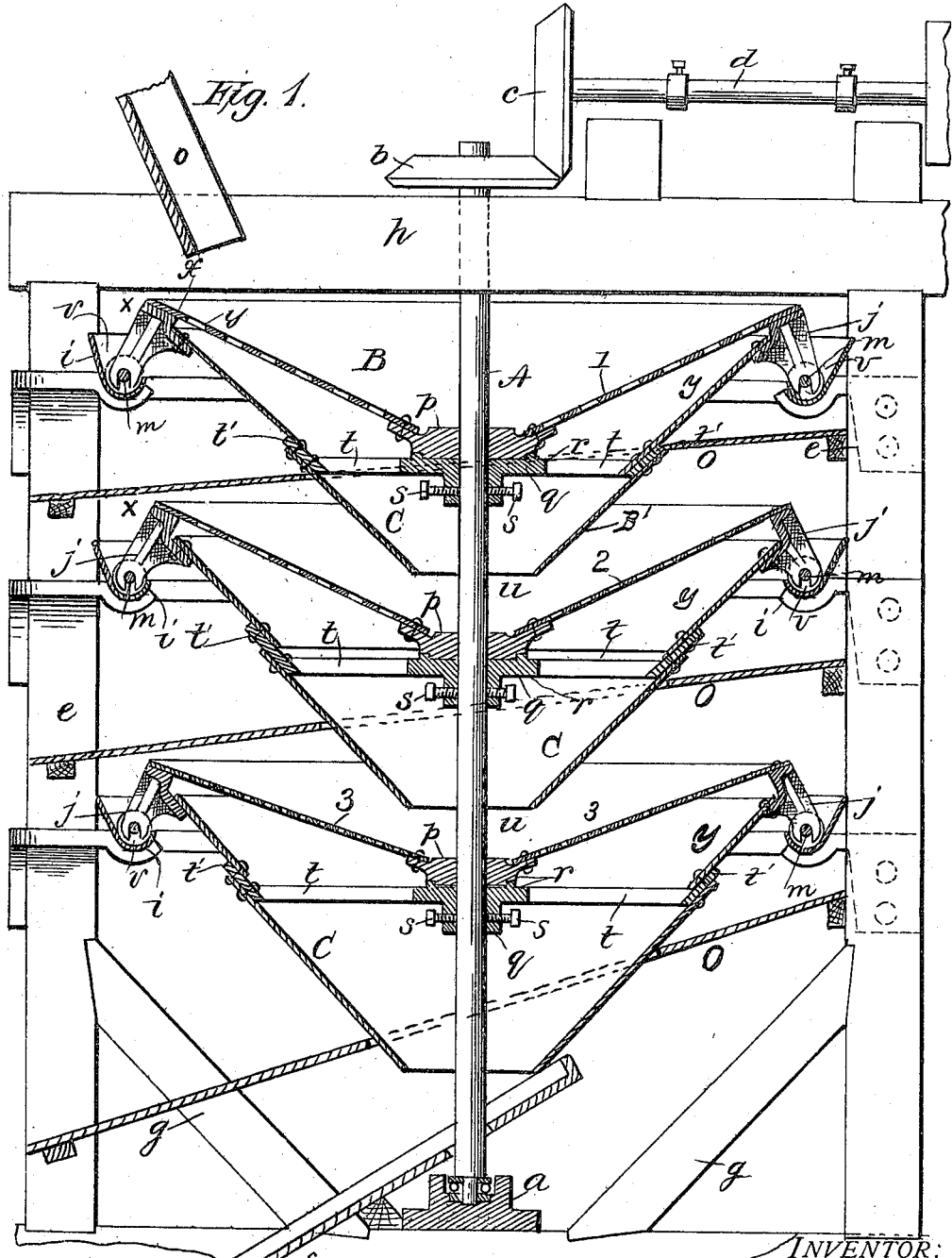

No. 838,441.     PATENTED DEC. 11, 1906.
F. NICHTER.
UPRIGHT ROTARY COAL SCREEN.
APPLICATION FILED JAN. 27, 1906.

4 SHEETS—SHEET 1.

WITNESSES:
Arthur W. Crossley
H. F. McKeever

INVENTOR:
Frank Nichter,
BY Louis Bagger & Co
Attorneys

No. 838,441. PATENTED DEC. 11, 1906.
F. NICHTER.
UPRIGHT ROTARY COAL SCREEN.
APPLICATION FILED JAN. 27, 1906.
4 SHEETS—SHEET 2.
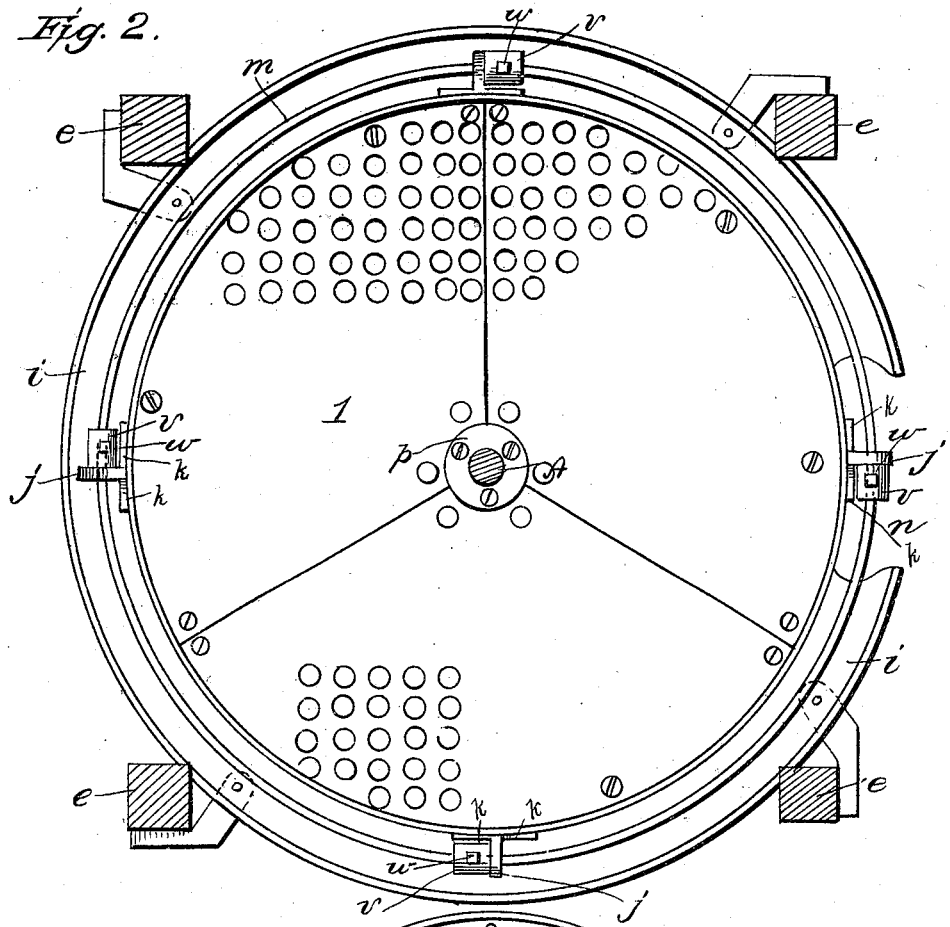
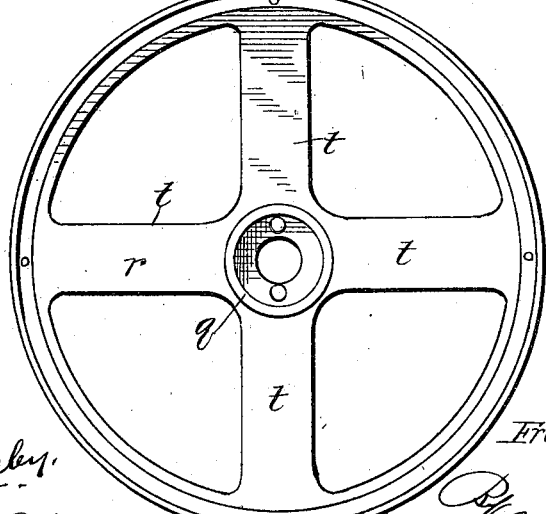
WITNESSES:
INVENTOR:
Frank Nichter,
Attorneys.

No. 838,441. PATENTED DEC. 11, 1906.
F. NICHTER.
UPRIGHT ROTARY COAL SCREEN.
APPLICATION FILED JAN. 27, 1906.
4 SHEETS—SHEET 3.
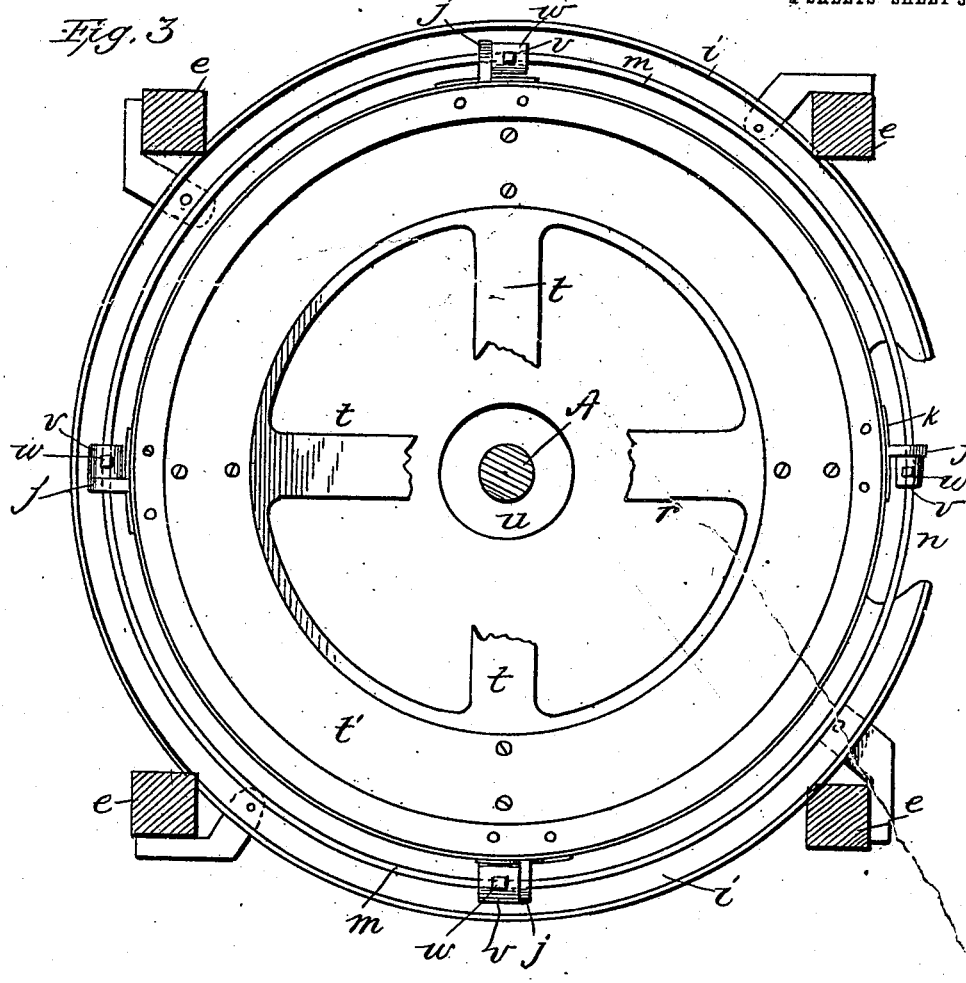
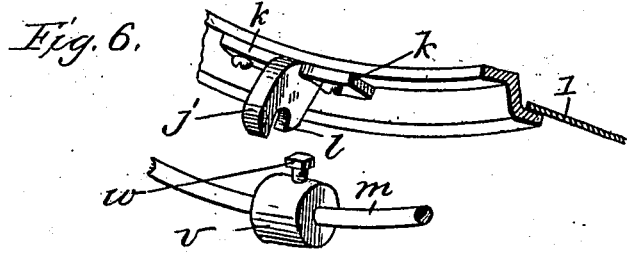
WITNESSES:
Arthur W. Crosley
L. T. McKenna
INVENTOR:
Frank Nichter,
By Louis Bagger & Co.
Attorneys

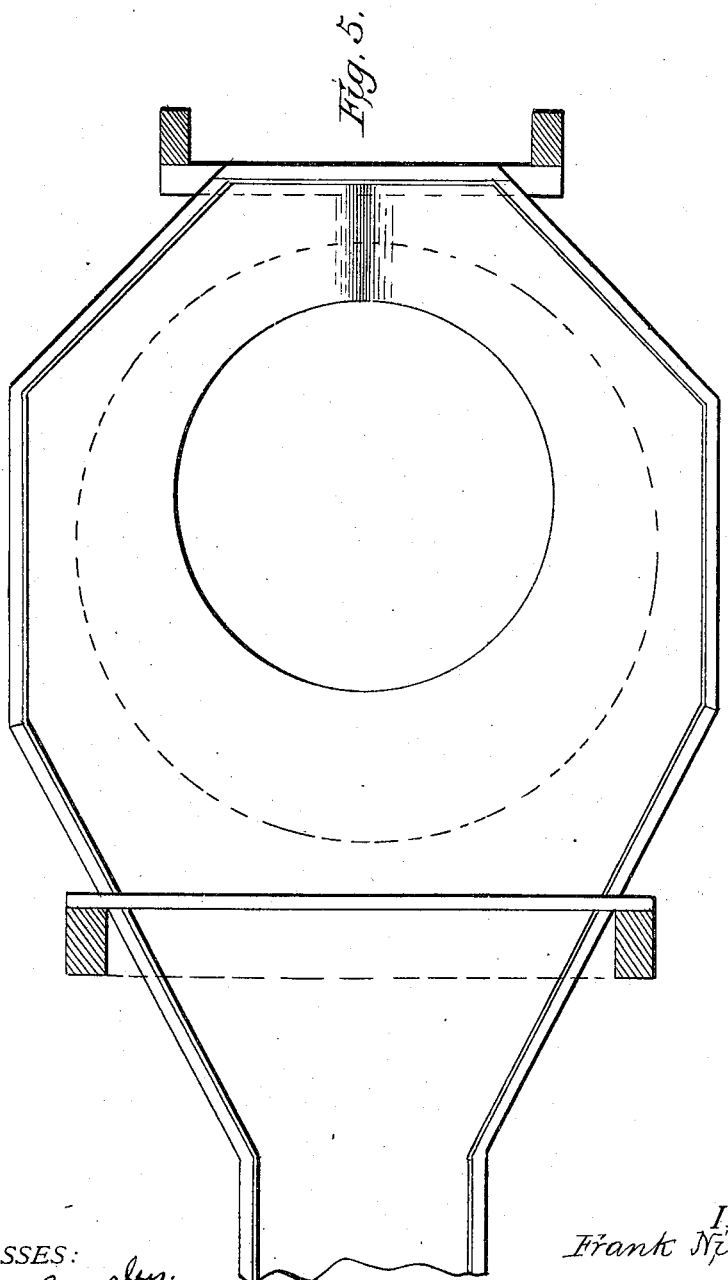

UNITED STATES PATENT OFFICE.

FRANK NICHTER, OF SCRANTON, PENNSYLVANIA.

UPRIGHT ROTARY COAL-SCREEN.

No. 838,441.       Specification of Letters Patent.       Patented Dec. 11, 1906.

Application filed January 27, 1906. Serial No. 298,225.

*To all whom it may concern:*

Be it known that I, FRANK NICHTER, a citizen of the United States, residing at Scranton, in the county of Lackawanna and State of Pennsylvania, have invented certain new and useful Improvements in Upright Rotary Coal-Screens, of which the following is a specification.

This invention has relation to the art of and means for screening or recovering coal of the finer grades by what is commonly called the "rotary process."

It is the object of the invention to provide an improved machine that will be more effective in its mode of operation than heretofore and that will keep the meshes of the screen clear or open and also that will be simple in its organization and dispose of an increased amount of coal in a given time.

The improvements embody a plurality of bread-pan-shaped screens arranged one above another, with an intervening hopper below each screen to convey the material passed through the screen above to the screen below and in the preferred form to have an annular trough surrounding each rotating screen to receive the coal that does not pass through the screen and that is therefore carried over the edge by centrifugal tendency. What are termed "scrapers" are connected with the edge of the rotary screen and moved around in the annular trough to a point or points where it is allowed to fall through into a chute or means for conveying it to a receptacle provided for the purpose.

The drawings hereto annexed form a part of this specification and are to be referred to as such, of which drawings—

Figure 1 is a central vertical sectional view of my improved screen complete. Fig. 2 is a plan of the upper hopper, parts removed to show the upper screen being represented in section. Fig. 3 is a plan of the screen below that equipped for screening. Fig. 4 is a plan view of one of the spiders secured to the central shaft below a screen. Fig. 5 is a plan of a modified form of chutes in connection with associated parts. Figs. 6 and 7 show parts hereinafter referred to as separated from their supports and associated means.

Like characters of reference designate like parts or features, as the case may be, wherever they occur.

The machine proper is supported and operated mainly by the central rotary shaft A, stepped in and on a suitable bearing $a$, employing hard-steel balls to obviate friction and make the shaft run easy. The said shaft is driven from its upper end by suitable means for imparting to it rotary motion. The said driving means may be belts and pulleys; but that herein represented consists of a miter-gear $b$ on the upper end of the vertical central shaft meshing with a like gear $c$ on a counter-shaft $d$, which has secured to it a pulley to receive a belt operated by any suitable prime motor, (the belt and its operating means not being shown.) Stout vertical timbers $e$, set in sills $f$ and braced, as at $g$, have cross-ties $h$ at their upper ends, with which other beams, timbers, and means forming parts of the machine, as shown, are connected. The upper end of the central rotary shaft has its bearings at that point connected with the frame.

To give a clear idea of the functions of the machine, it may be stated that it is designed to screen only the finer grades of coal. Of course it is not proposed to limit this improved machine to coal of any particular size; but as herein shown it is constructed to receive its supply through a chute $o$ at the top of the machine, which supply is derived from another screen (not shown) located above in the breaker. This breaker-screen is supposed to have a screen with a three-eighths-of-an-inch mesh, and therefore the said supply delivered to the screen B will be three-eighths of an inch in diameter and all sizes under or smaller.

The top screen is designated by B and is covered by segmental plates $l$, having openings of one-fourth of an inch in diameter.

Below the outer margins of the screening-plates of each screen there is an annular trough $i$, into which scrapers connected with the edge of the screen extend. The said scrapers consist of plates $j$, integrally connected at their upper ends to short pieces $k$, secured to the rim of the screen-support, and extend down into the trough $i$, being notched at their lower ends, as at $l$, to straddle a wire $m$, which lies in the annular trough.

The supply coming in through the chute $o$ will be delivered into the upper screen, and as the screen is rotated at the rate of, say, forty revolutions per minute all coal that is not small enough to pass through the meshes of the top screen 1 will by centrifugal tendency be forced or caused to move to and over the outer edges of the screen into the annular trough $i$, where it will be engaged by the scrapers $j$ and moved around to a point $n$, (see Fig. 2,) where the trough is cut away, as shown, and will fall through or out into a chute O and be carried away, as before indicated.

The inner lower edges of the segmental screens 1 will rest upon and be connected with a collar $p$, surrounding the central shaft. The said collar in turn rests upon and is carried around by the collar $q$ of the spider $r$, which latter collar is held upon the central shaft by set-screws $s$, as shown.

The radial arms $t$ of the spider $r$ will at their outer ends support an upwardly-inclined rim $t'$, that in turn supports or aids in supporting both the upper and lower inclined plates Y B' of the screens. All of these parts may be of the form shown or be mechanically varied to suit the exigencies of particular cases or the varied forms of other parts.

The coal that passes through the screen 1 will fall upon the chute-plates C below and slide down by gravity to the lower ends and pass through the opening $u$ around the central shaft on the screen 2, where by rotary action it will be treated as by screen 1, the meshes of which screen 2 are smaller. Hence the coal carried by centrifugal tendency over the edges of screen 2 will be smaller than that of screen 1, and the same degree of grading will take place on screen 3 (which is the lowest of the machine) and from which the material falling through the opening around the central shaft will be considered too fine for use as coal and be treated as refuse.

The inclination of each succeeding screen will be less than that above, for the reason that as the coarser coal is removed from the mass being treated the force necessary to carry it from the center up over the edge of the screen will become less.

The hoppers C below the screens are steeper or of greater inclination than the latter, for the reason that the material deposited thereon would not slide down promptly to the center and be delivered through the opening around the central shaft unless given the slope or inclination of about the degree shown.

In the process of screening there will be a tendency of some particles of coal not small enough to pass entirely through the screen to lodge in the meshes; but I give such slope to the screens that such pieces as lodge in the meshes will be forced through the screen by centrifugal force and by the dust and smaller coal driven or carried thereagainst to force or drive the lodged coal through. By this process I am enabled to keep the screens free.

Instead of providing the annular trough around the margin of each screen I may do away with it and catch the coal driven over the edges of the screen on a broad platform-chute, as shown in Fig. 5. Other means of recovering the screened coal may be used or other forms of chutes may be employed without departing from my invention in other particulars.

My method of keeping the screens clean or open does away with the necessity of using water for the purpose, as in the case of shaking-screens, where stiff brushes in addition to water and shaking the screens are employed, rendering the machine more complicated and harder of manipulation or use.

Collars $v$ will be arranged on the wire $m$ behind the scrapers $j$ and be secured in place by a set-screw $w$, so as to assist to keep the scrapers and wire in place, and which collars also materially aid the action of the scrapers $j$ in moving the material along the trough $i$.

The rim $x$ at the outer edge of the screen is supported by the imperforate web $y$ between the upper edge of the rim $t'$ and said rim.

It is obvious that more or less than three screens may be operated in my improved upright rotary coal-screen and that I may begin with the use of larger or smaller coal than that stated delivered through the chute $o$.

I claim—

1. In an upright rotary coal-screen, the combination, with the central rotary shaft, of a series of hopper-like outline screens of graded mesh, each succeeding screen from the top downward being of less inclination, and funnel-shaped members below each screen, for delivering the substance caught thereby to the screen below.

2. In an upright rotary coal-screen, the combination, with a central rotary shaft, of a series of hopper-like outline screens of graded mesh, each succeeding screen from the top downward being of less inclination, and means around the outer edge of each screen for catching the coal forced thereover.

3. In an upright rotary coal-screen, the combination, with a central rotary shaft, of a series of hopper-like outline screens of graded mesh, each succeeding screen from the top downward being of less inclination, and means around the outer edge of each screen for catching the coal forced thereover, and a funnel-shaped member below each screen, the material caught by said funnel-shaped member being delivered through an opening to the screen below.

4. An upright rotary coal-screen, comprising a central rotary shaft, a series of centrally and downwardly inclined screens for the screening of the coal, by centrifugal action, said screens having annular troughs arranged around their outer upper edges to receive the coal carried thereover, scrapers applied to said screen outer edges, adapted to engage the coal in said troughs and deliver it therefrom, annular wires arranged in said troughs, astride of which are arranged said scrapers, collars secured to said wires, behind said scrapers, and means effecting connection between said shaft and said screens.

5. In an upright rotary coal-screen, the combination, with a central shaft, of centrally and downwardly inclined screens, funnel-shaped members arranged below said screens, metallic rims connecting the outer edges of said screens and said funnel-shaped members, and a collar surrounding and connected to the shaft and having said funnel-shaped members connected thereto.

6. In an upright rotary coal-screen, the combination, with a central shaft, of a series of centrally and downwardly inclined screens, means connected to said shaft for supporting the inner edges of said screens, a rim on the outer edge of each screen, a spider provided centrally with a collar secured to said shaft and with radial arms, a funnel-shaped member connected with the ends of said arms, and a web connecting said funnel-shaped member with said rim.

In testimony whereof I have signed my name to this specification in the presence of two subscribing witnesses.

FRANK NICHTER.

Witnesses:
DANIEL R. REESE,
J. E. VAUGHAN.